Figure 1:
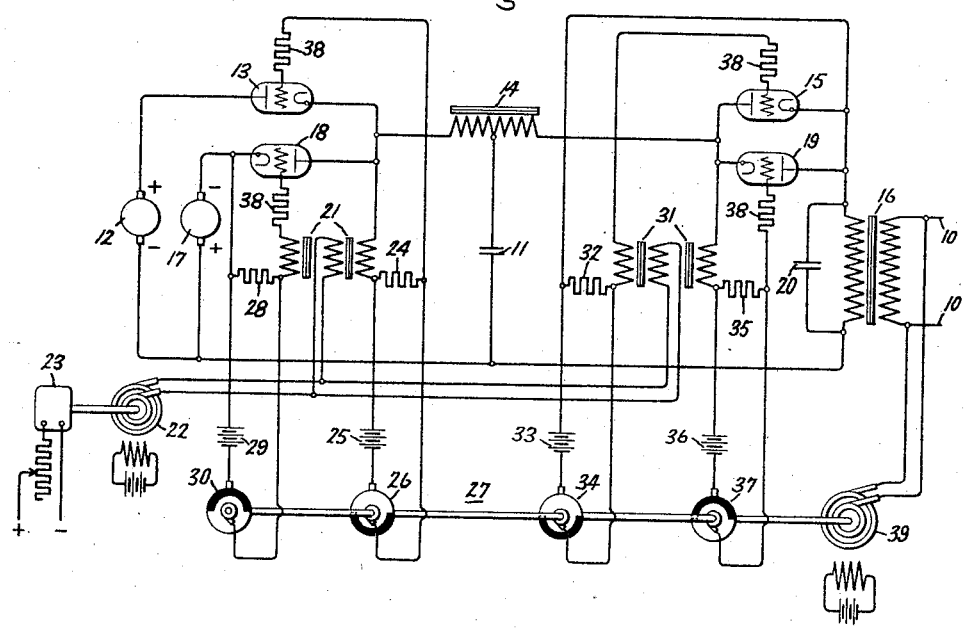

Dec. 27, 1932.    R. TRÖGER    1,892,543
ELECTRIC VALVE CONVERTING SYSTEM
Filed May 12, 1932    2 Sheets-Sheet 2

Inventor:
Richard Tröger,
by Charles W. Mullen
His Attorney.

Patented Dec. 27, 1932

1,892,543

UNITED STATES PATENT OFFICE

RICHARD TRÖGER, OF BERLIN-ZEHLENDORF-MITTE, GERMANY, ASSIGNOR TO GENERAL ELECTRIC COMPANY, A CORPORATION OF NEW YORK

ELECTRIC VALVE CONVERTING SYSTEM

Application filed May 12, 1932, Serial No. 610,961, and in Germany May 27, 1931.

My invention relates to electric valve converting systems and more particularly to such systems adapted to transmit energy from a direct current supply circuit to an alternating current load circuit.

Heretofore there have been proposed numerous arrangements including electric valves for transmitting energy from a direct current supply circuit to an alternating current load circuit. One type of such arrangements, known in the art as a series inverter, has found particular favor for certain applications because of its stability, freedom from short circuits occasioned by valve failures, and its ability to operate at relatively high frequencies. This type of apparatus comprises, in general, a capacitor, a circuit for charging the capacitor from a source of direct current including an electric valve, and a discharge circuit for the capacitor including another electric valve, the conductivity of the valves being controlled so that the capacitor is successively charged and discharged, and the alternating current circuit is energized from one or both of the capacitor circuits. However, when operating this type of apparatus at relatively low frequencies, such for example, as the usual commercial frequencies, the cost of the capacitor tends to make the apparatus relatively less economical than certain other converting arrangements. An apparatus of the type just described is disclosed and claimed in United States Letters Patent No. 1,752,247, granted March 25, 1930, upon the application of A. S. FitzGerald.

It is an object of my invention, therefore, to provide an improved electric valve converting system of the series inverter type which will overcome the above mentioned disadvantages of the arrangements of the prior art, and which will be simple, economical and reliable in operation.

It is another object of my invention to provide an improved electric valve converting system of the series inverter type suitable for transmitting energy from a direct current supply circuit to an alternating current load circuit of commercial frequency in which the size of the series capacitor may be substantially reduced.

It is a further object of my invention to provide an improved electric valve converting system of the series inverter type for transmitting energy from a direct current supply circuit to a relatively low frequency alternating current circuit in which the charging and discharging of the series capacitor occurs at a frequency substantially higher than that of the alternating current circuit.

In accordance with my invention a capacitor is adapted to be charged from a source of current through an electric valve and to be discharged through another electric valve, the load circuit being energized from one of the capacitor circuits. The conductivity of the valves is controlled to periodically charge and discharge the capacitor at a relatively high frequency while the valve in the capacitor circuit from which the load circuit is energized is maintained nonconductive during alternate half cycles of the load current. In certain embodiments of my invention, one or more portions of the above described circuits are duplicated in order to supply the load circuit with alternate half cycles of opposite polarity and to effect certain apparatus economies.

Figure 2:
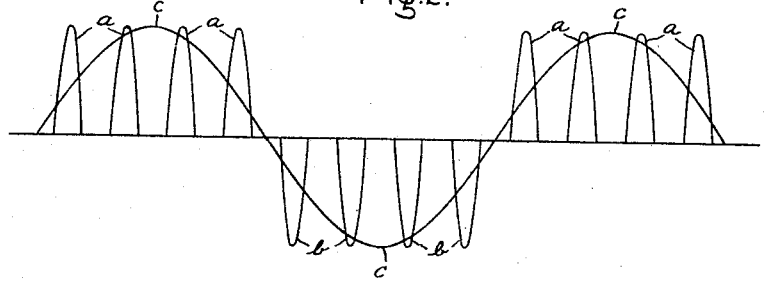
Figure 3:
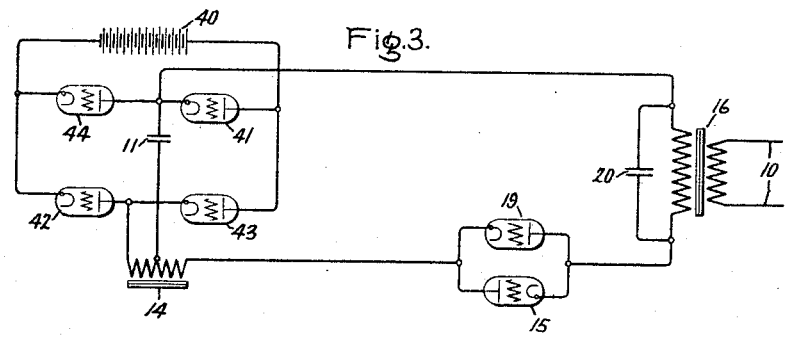
Figure 4:
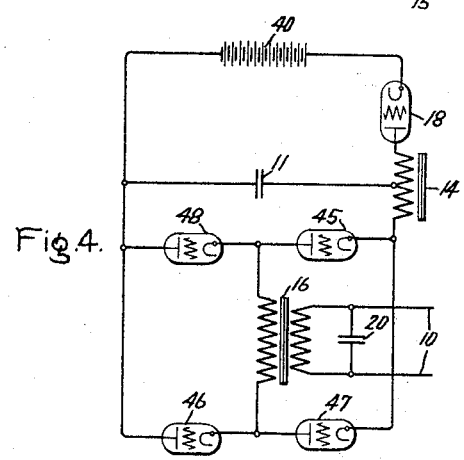
Figure 5:
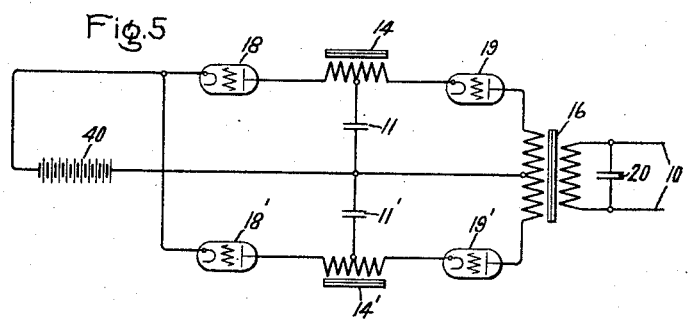
Figure 6:
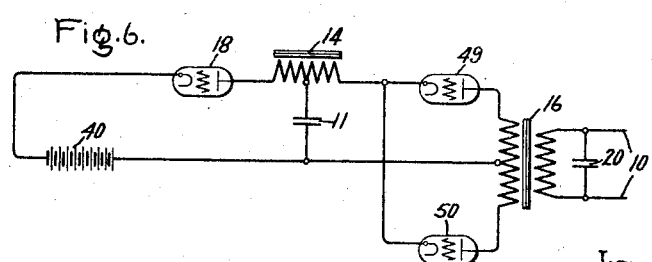

For a better understanding of my invention, together with other and further objects thereof, reference is had to the following description taken in connection with the accompanying drawings, and its scope will be pointed out in the appended claims. Fig. 1 of the drawings illustrates an arrangement embodying my invention for producing a relatively low frequency alternating current from two independent sources of direct current; Fig. 2 shows certain operating characteristics of the apparatus illustrated in Fig. 1; Fig. 3 illustrates a modification of the arrangement of Fig. 1 in which the two independent sources of direct current are replaced by a single source of direct current; Fig. 4 shows an arrangement in which the capacitor is alternately discharged through the load circuit in opposite directions; Fig. 5 illustrates an arrangement in which two complete series inverters cooperate to produce the object of my invention, while Fig. 6 represents a simplification of the arrangement of Fig. 4.

Referring now more particularly to Fig. 1 of the drawings, there is illustrated an arrangement embodying my invention for supplying alternating current of relatively low frequency to a load circuit 10. This apparatus includes a series type inverter comprising a capacitor 11, a source of direct current 12, and a circuit for charging the capacitor from the source including an electric valve 13 and the left hand portion of a reactance device 14 provided with an electrical midpoint, while the capacitor 11 is adapted to be discharged through the other portion of the reactance device 14, electric valve 15 and the primary winding of the output transformer 16, the secondary winding of which is connected to the load circuit 10. The above described inverter supplies half cycles of alternating current of a predetermined polarity and, with the proper control described hereinafter, may be sufficient in certain instances. However, in case it is desired to supply full wave alternating current to the load circuit 10, there is provided a second series type inverter which may have certain elements in common with the first inverter. For example, as illustrated, the second inverter comprises the capacitor 11, a source of direct current 17, and a circuit including electric valve 18 and the left hand portion of reactance device 14 for charging the capacitor 11 from the source 17 to a polarity opposite to that of the first inverter. The discharge circuit of the capacitor 11 for the second inverter comprises the right hand portion of the reactance device 14, electric valve 19, and the primary winding of the transformer 16. Each of the electric valves 13, 15, 18 and 19 is provided with an anode, a cathode and a control grid and may be of any of the several types well known in the art, although I prefer to use valves of the vapor electric discharge type. A capacitor 20 may be connected across the transformer 16 as indicated to improve the wave form of the alternating current supplied to the load circuit 10.

In order to control the conductivity of the several electric valves so that the capacitor 11 may be charged and discharged at a relatively high frequency, and so that, at the same time, a relatively low frequency current may be supplied to the load circuit 10, the control grid of each of the several valves is provided with a control circuit including a relatively high frequency component of excitation and a second component of excitation of the frequency which it is desired to supply to the load circuit 10. For example, the grid circuit of the electric valve 13 receives a relatively high frequency component of excitation from the secondary winding of a grid transformer 21, the primary winding of which may be energized from any suitable source of alternating potential of high frequency, such for example, as a synchronous generator 22 driven by a variable speed direct current motor 23. The grid circuit of this valve also receives a component of excitation of the frequency which it is desired to supply the load circuit 10 from a resistor 24, which is energized from a negative bias battery 25 through the section 26 of a commutator 27. Similarly, the grid circuit of electric valve 18 receives a high frequency component of excitation from an additional secondary winding of the grid transformer 21, and a low frequency component of excitation from a resistor 28 connected across a negative bias battery 29 through the section 30 of the commutator 27; the grid circuit of the valve 15 receives a high frequency component of excitation from a secondary winding of a grid transformer 31 and a low frequency component from a resistor 32 energized from a negative bias battery 33 through the section 34 of the commutator 27; the grid circuit of the valve 19 receives a high frequency component of excitation from an additional secondary winding of the grid transformer 31 and a low frequency component from a resistor 35 connected across a negative bias battery 36 through the section 37 of the commutator 27. Current limiting resistors 38 are preferably connected in the several grid circuits as illustrated. In case the alternating current circuit 10 is connected to an independent source of electromotive force for determining its frequency and phase relation, the commutator 27 may be driven by means of a synchronous motor 39 energized directly from the circuit 10. If, however, the circuit 10 is not connected to an independent source of electromotive force, the motor 39 may be energized from any suitable source of alternating current of the frequency which it is desired to supply the circuit 10.

In explaining the operation of the above described apparatus, it will be assumed that, initially, the commutator 27 is in the illustrated position so that a negative bias is applied to the grids of electric valves 13 and 15 through the sections 26 and 34 of the commutator 27. The amplitude of this bias should be sufficient to maintain the grids of the valves 13 and 15 negative in spite of the relatively high frequency alternating potential supplied by the grid transformers 21 and 31. The valves 18 and 19, however, will be rendered alternately conductive by the high frequency component of excitation derived from the generator 22, the capacitor 11 becoming charged through the electric valve 18 when its grid is positive and discharging through electric valve 19 when its grid is positive. It will be seen that the discharge current of the capacitor 11 flows through the primary winding of the transformer 16 thus supplying it with a series of unidirectional current impulses. These may be represented by the curves a of Fig. 2, which are based upon a ratio between the high frequency excitation and the frequency of the load circuit 10 of 8 to 1, that is, eight complete cycles of operation of the series inverter take place during each cycle of the low frequency current. When the commutator 27 has moved through such an angle that the circuit is broken through the sections 26 and 27 and completed through the sections 30 and 37 the negative bias is removed from the valves 13 and 15 and impressed upon the grids of the valves 18 and 19, thus maintaining them non-conductive. The above operation is now repeated, the energy being supplied by the source 12 to charge the capacitor 11 to a polarity opposite to that resulting from the operation described above. If the capacitor 11 is charged to an opposite polarity, its discharge current will also be of reverse polarity and may be represented by the curves b of Fig. 2. The above described cycle is repeated indefinitely, thus supplying alternating current to the load circuit 10. The capacitor 20 connected across one of the windings of the transformer 16 serves to smooth out the ripples of the current impulses supplied by the discharge current of the capacitor 11, and produce a substantially sinusoidal output current as illustrated by the curve c of Fig. 2. In this manner relatively low frequency alternating current is supplied to the load circuit 10 while the capacitor 11 operates at a relatively high frequency so that its rating may be substantially less than if it were operated at the relatively low frequency of the circuit 10.

In Fig. 3 there is illustrated a modification of my invention in which the two independent sources of direct current are replaced by a single source of current 40. In this arrangement the capacitor 11 may be charged to one polarity through a circuit including an electric valve 41, one portion of the reactance device 14 and an electric valve 42, and to the opposite polarity through a circuit including an electric valve 43, the same portion of the reactance device 14 and electric valve 44. In this arrangement the electric valves 41 and 42 receive the same grid control as electric valve 18 in the arrangement of Fig. 1 and the grids of the valves 43 and 44 receive the grid excitation of the electric valve 13 of Fig. 1. In other respects the operation is substantially identical.

In Fig. 4 there is shown another modification of my invention in which the capacitor 11 is always charged to a predetermined polarity from a source of current 40 through electric valve 18, but in which the discharge current flows through the primary winding of the load circuit 16 alternately in opposite directions. For example, during one half cycle of the low frequency current, the discharge current of the capacitor 11 will flow through an electric valve 45, the primary winding of the transformer 16 and an electric valve 46, while during alternate half cycles the discharge current of the capacitor 11 will flow through an electric valve 47, the primary winding of the transformer 16 and an electric valve 48. With this arrangement, it will be understood that the electric valves 45 and 46 will have the same grid excitation as one of the electric valves 15 or 19 of the arrangement of Fig. 1, while electric valves 47 and 48 will have the grid excitation of the other of the electric valves 15 or 19.

In Fig. 5 is shown a further modification of my invention which requires the use of only four electric valves rather than six as in the arrangements of Figs. 3 and 4, and only a single source of unidirectional current, but which requires the use of an additional capacitor 11' and reactor 14'. In this arrangement, one of the series inverters, for example, that comprising electric valves 18 and 19, reactance device 14 and capacitor 11, is duplicated by a second inverter comprising the same elements with the reference numerals primed. These independent inverters are supplied from a common source of unidirectional current 40 and supply current of opposite polarity to the primary windings of the output transformer 16.

In Fig. 6 there is illustrated a half wave arrangement of the circuit illustrated in Fig. 4 in which the discharge current of the capacitor 11 flows alternately through the two portions of the primary winding of the transformer 16 and the electric valves 49 and 50.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. An electric valve converting system comprising a source of current, a capacitor, a circuit for charging said capacitor from said source including an electric valve, a discharging circuit for said capacitor including a second electric valve, a periodic current load circuit energized from one of said capacitor circuits, one of said valves being common to said load circuit and one of said capacitor circuits, means for controlling the conductivity of said valves to charge and discharge said capacitor at a frequency substantially higher than that of said load circuit, and means for maintaining said valve in the load circuit nonconductive during alternate half cycles of said load current.

2. An electric valve converting system comprising a source of direct current, a capacitor, a circuit for charging said capacitor from said source including an electric valve, a discharging circuit for said capacitor including a second electric valve, said discharging circuit including also a periodic current load circuit, means for controlling the conductivity of said valves to charge and discharge said capacitor at a frequency substantially higher than that of said load circuit, and means for maintaining said valves non-conductive during alternate half cycles of said load current.

3. An electric valve converting system comprising a source of current, a capacitor, a circuit for charging said capacitor from said source including an electric valve provided with a control grid, a discharging circuit for said capacitor including a second electric valve provided with a control grid, a periodic current load circuit energized from one of said capacitor circuits, one of said valves being common to said load circuit and one of said capacitor circuits, means for exciting the control grids of said valves with alternating potentials opposite in phase and of a frequency substantially greater than that of said load circuit, and means for maintaining a negative bias on the control grid of said last mentioned valve during alternate half cycles of said load current.

4. An electric valve converting system comprising a source of current, a capacitor, a circuit for charging said capacitor from said source including an electric valve provided with a control grid, a discharging circuit for said capacitor including a second electric valve provided with a control grid, a periodic current load circuit energized from one of said capacitor circuits, a source of alternating potential of a frequency of a higher order of magnitude than that of said load circuit, circuits for exciting the grids of said valves from said alternating source, and means for superimposing on said grid circuits a negative bias potential greater in amplitude than said alternating control potential during alternate half cycles of said load currents.

5. An electric valve converting system comprising a capacitor, a circuit including an electric valve for charging said capacitor to one polarity, a circuit including a second electric valve for charging said capacitor to an opposite polarity, a discharge circuit for said capacitor including another electric valve, an alternating current load circuit energized from one of said capacitor circuits, means for maintaining each of the valves in said charging circuits non-conductive during alternate half cycles of said load current, and means for controlling the conductivity of said valves to charge and discharge said capacitor at a frequency substantially higher than that of said load circuit.

6. An electric valve converting system comprising a capacitor, a circuit including an electric valve for charging said capacitor to one polarity, a circuit including a second electric valve for charging said capacitor to an opposite polarity, a discharge circuit for said capacitor including a pair of electric valves reversely connected in parallel and an alternating current load circuit, means for maintaining nonconductive each of said valves in said charging circuit and each of said valves in said discharging circuit during alternate half cycles of said load current, and means for controlling the conductivity of said valves to charge and discharge said capacitor at a frequency substantially higher than that of said load circuit.

7. An electric valve converting system comprising a source of current, a capacitor, a circuit including a pair of electric valves for charging said capacitor from said source to one polarity, a circuit including a second pair of electric valves for charging said capacitor from said source to an opposite polarity, a discharge circuit for said capacitor including a pair of electric valves reversely connected in parallel and an alternating current load circuit, means for maintaining nonconductive each of said valves in said charging circuit and each of said valves in said discharging circuit during alternate half cycles of said load current, and means for controlling the conductivity of said valves to charge and discharge said capacitor at a frequency of a higher order of magnitude than that of said load circuit.

8. An electric valve converting system comprising a source of current, a capacitor, a circuit including an electric valve for charging said capacitor from said source, a pair of discharging circuits for said capacitor each including an electric valve, an alternating current load circuit energized from said discharging circuits in an opposite sense, means for controlling the conductivity of said valves to charge and discharge said capacitor at a frequency substantially higher than that of said load circuit, and means for maintaining nonconductive each of the valves in said discharging circuits during alternate half cycles of said load current.

9. An electric valve converting system comprising a source of current, a capacitor, a circuit including an electric valve for charging said capacitor from said source, a bridge circuit each arm of which includes an electric valve, one diagonal of said bridge circuit being connected to form a discharge circuit for said capacitor, an alternating current load circuit connected across the other diagonal of said bridge circuit, means for controlling the conductivity of said valves to charge and discharge said capacitor at a frequency substantially higher than that of said load circuit, and means for maintaining nonconductive each pair of valves forming opposite arms of said bridge circuit during alternate half cycles of said load current.

10. An electric valve converting system comprising a source of current, a capacitor, a circuit including an electric valve for charging said capacitor from said source, an output transformer provided with a pair of primary windings, a pair of discharging circuits for said capacitor each including an electric valve and one of said transformer windings, the connections being such that the currents flowing in said discharge circuits energize said transformer with opposite polarities, means for alternately maintaining nonconductive the valves in said discharging circuits at the frequency with which it is desired to energize said transformer, and means for controlling the conductivity of said valves to charge and discharge said capacitor at a frequency substantially higher than said first mentioned frequency.

In witness whereof, I have hereunto set my hand.

RICHARD TRÖGER.